United States Patent [19]

Troglione

[11] 3,726,404
[45] Apr. 10, 1973

[54] BATCH OZONATORS FOR DRINKING WATER

[75] Inventor: Vincent R. Troglione, Meadville, Pa.

[73] Assignee: Moody Aquamatics Systems, Inc., Meadville, Pa.

[22] Filed: July 26, 1971

[21] Appl. No.: 165,514

[52] U.S. Cl. .................... 210/139, 210/192, 210/259
[51] Int. Cl. ............................................ B01d 35/28
[58] Field of Search ........................ 210/63, 138, 139, 210/192, 259, 261, 262, 416; 204/318

[56] References Cited

UNITED STATES PATENTS 3,445,001   5/1969   La Raus ............................ 210/139 X

*Primary Examiner*—Frank A. Spear, Jr.
*Attorney*—Shlesinger, Fitzsimmons & Shlesinger

[57] ABSTRACT

Each ozonating unit comprises a contact tank containing a diffuser, an ozone generator for supplying ozone gas to the diffuser, a storage tank or reservoir removably mounted adjacent the contact tank, and a water pump having its inlet connected to the contact tank and its inlet connected to the contact tank and its outlet connected through a filter with the storage tank, when the latter is in its operative position. After a contact tank is filled with drinking water, a dual contact timer device on each unit is set manually to operate the associated ozone generator for a predetermined interval of, e.g., 5, 10, 15, 20 minutes, etc. After each operation of a generator, the associated water pump is automatically energized for a predetermined time to pump the ozonated water from a contact tank to the associated storage tank.

13 Claims, 6 Drawing Figures

INVENTOR.
VINCENT R. TROGLIONE

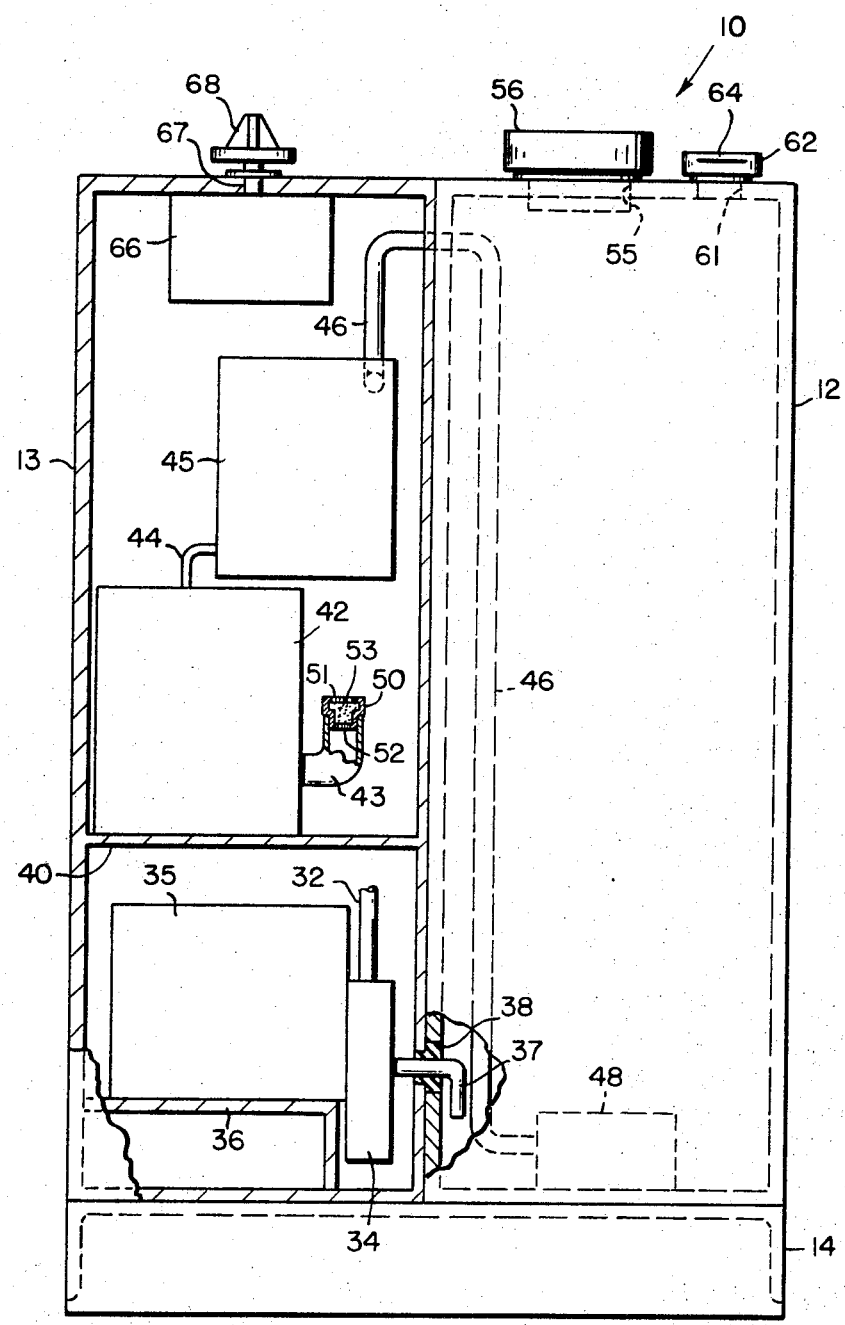

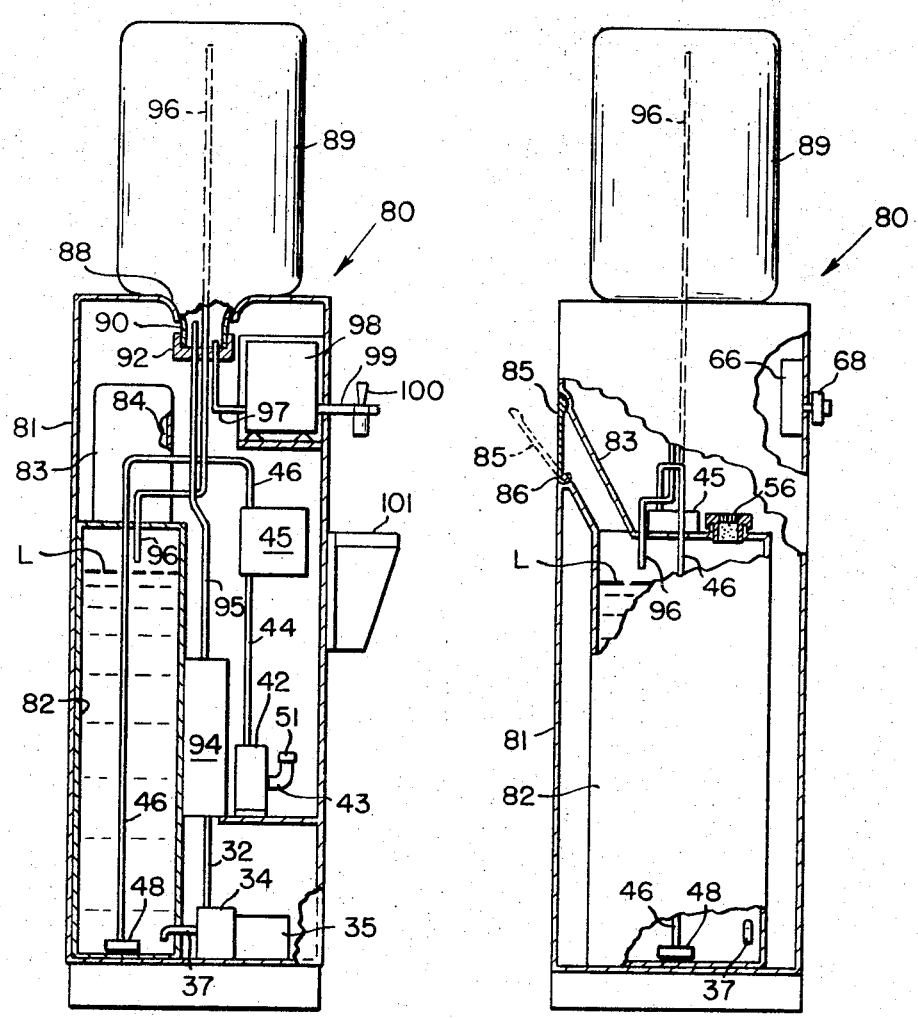

BATCH OZONATORS FOR DRINKING WATER

This invention relates to apparatus for purifying drinking water, and more particularly to batch-type ozonating units for purifying drinking water in relatively small quantities.

Although ozone gas generating equipment has long been employed as an aid to the purification of water for drinking purposes, most such prior equipment has been designed for installation in the water supply systems for homes, buildings, etc., so that the water is purified prior to its discharge from the system water faucets or taps. Consequently, most prior such equipment has been relatively expensive, bulky, and generally impractical for use in areas where the demand for satisfactory drinking water is relatively infrequent, or at least does not warrant expenditure of the relatively large amounts of capital heretofore required to purchase and install conventional ozonating equipment. In addition to being rather expensive, most such prior ozonating equipment has tended to be extremely bulky and rather complicated to operate.

It is an object of this invention to provide improved, batch-type ozonators, which are particularly suitable for intermittently purifying relatively small quantities or batches of drinking water.

Another object of this invention is to provide improved ozonator units of the type described which are extremely simple to operate, and relatively inexpensive to manufacture.

Still another object of this invention is to provide improved ozonator units in which quantities of water are ozonated in one tank or container, and then automatically pumped or transferred to another container.

A further object of this invention is to provide improved batch-type ozonators that have replaceable filter units for removing moisture from the air admitted to the associated ozone generator, and for removing excess ozone gas from the ozonated water.

Other objects of the invention will be apparent hereinafter from the specification and from the recital of the appended claims, particularly when read in conjunction with the accompanying drawings.

In the drawings:

FIG. 3 is a fragmentary rear elevational view of this unit with parts thereof broken away and shown in section for purposes of illustration;

FIG. 4 is a side elevational view of a modified ozonator unit made in accordance with a second embodiment of this invention, portions thereof being broken away and shown in section for purposes of illustration;

FIG. 5 is a rear elevational view of this modified unit, portions thereof again being cut away and shown in section.

Figure 1:
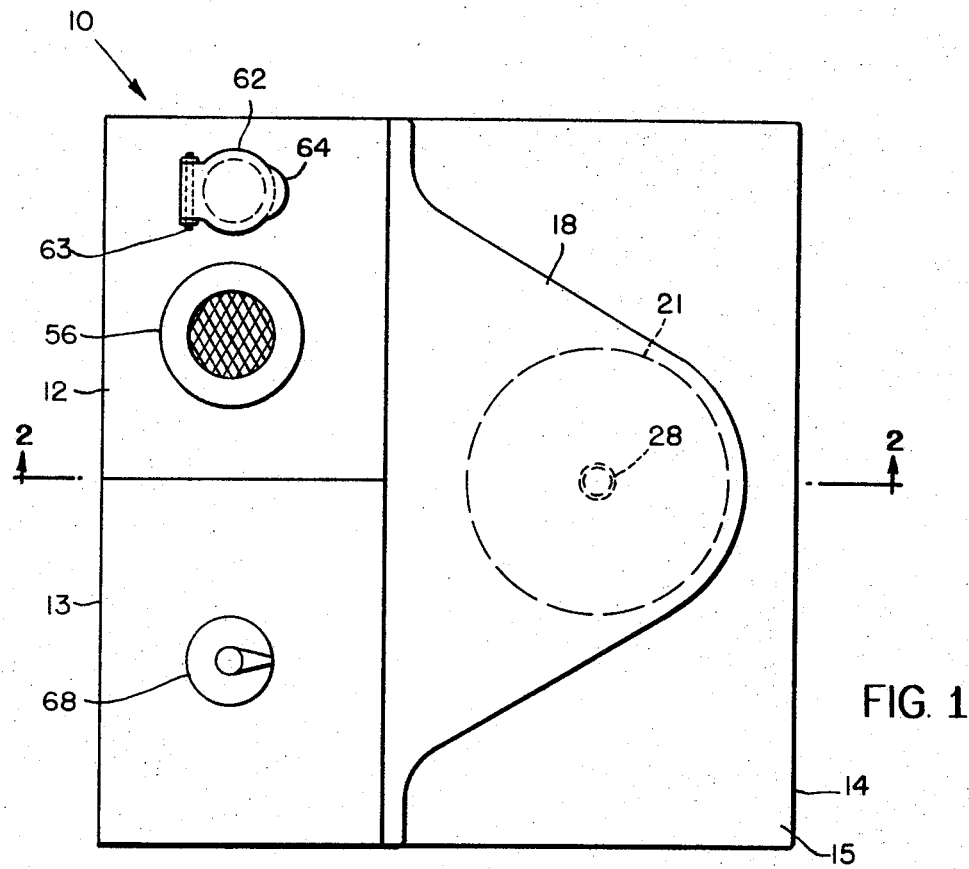
FIG. 1 is a plan view of a batch-type ozonator unit made in accordance with one embodiment of this invention.

Referring now to the drawings by numerals of reference, and first to the embodiment illustrated in FIGS. 1 to 3, 10 denotes generally a water purification unit of the small appliance variety. It comprises a rectangular contact tank 12, and a similarly shaped equipment housing 13, which are mounted side by side on the upper surface of a rectangular base 14. Base 14 projects laterally beyond the forward sides of tank 12 and housing 13 to provide a horizontal support 15 for a conventional water pitcher 16 (FIG. 2), or the like.

Mounted on the upper ends of tank 12 and housing 13 to project forwardly therefrom over the pitcher-supporting surface 15 on base 14 is a lateral filter support or bracket 18, which in plan view (FIG. 1) is nearly semi-circular in configuration. Along its straight edge or side, bracket 18 has an integral, downwardly projecting rib or flange 19, which is secured, releasably otherwise, to the forward faces of tank 12 and housing 13 to support the rounded portion of bracket 18 horizontally. On its underside bracket 18 also has an integral, annular skirt portion 21, which is spaced forwardly of the flange 19 to register centrally with surface 15.

Releasably threaded at its upper, open end in the lower end of the skirt portion 21 coaxially thereof is a hollow, cylindrical, generally cup-shaped filter housing 23. Releasably secured in housing 23 coaxially thereof, and projecting centrally into the skirt portion 21 is an elongate, annular filter element 24. Opposite ends of element 24 are seated sealingly against the circumferential edges of confronting, cylindrical bosses 25 and 26, which project, respectively, from the closed end of housing 23, and the underside of bracket 18. Secured at its upper end in an opening in the closed end of housing 23 centrally of boss 25 is a tubular discharge pipe 28, the lower end of which projects slightly beneath housing 23.

Above the upper end of housing 23 the skirt portion 21 of bracket 18 has therethrough a radial port 30 (FIG. 1) for admitting water to the annular space between housing 23 and the filter element 24. A supply pipe or tube 32 is secured at one end in this port 30, and extends at its opposite end in any conventional manner into the housing 13 where it is connected to the output of a water pump 34 (FIG. 3). Pump 34 is mounted in housing 13 adjacent the lower end of tank 12, and is driven by an electric motor 35, which is supported on a shelf 36 in housing 13. The inlet to pump 34 is connected to the lower end of tank 12 by a pipe 37, which extends through registering openings in the wall of housing 13 and an annular grommet or seal 38 in the wall of the tank.

Mounted on a further shelf 40 (FIG. 3) in housing 13 above the water pump 34 is an air pump 42. This pump has an air inlet pipe 43, and a compressed air outlet connected by a pipe 44 to a conventional ozone generator 45 that is mounted in housing 13 above pump 42. A pipe 46, which is connected to the output of generator 45, extends through registering openings in the walls of the housing 13 and tank 12 adjacent the upper ends thereof, and then downwardly in tank 12 to a conventional diffuser 48, which is positioned in tank 12 on the bottom thereof.

As described hereinafter, the air pump 42 is operable to supply compressed air to the generator 45, which in turn generates ozone gas that is fed through pipe 46 to the diffuser 48, which breaks up the ozone gas into fine bubbles that rise through the water tank to kill undesirable viruses and bacteria in the water, as well as to remove therefrom obnoxious odors, tastes, and the like.

One of the major problems encountered in the operation of ozone generators of the type described is that objectionable moisture is developed by adiabatic expansion of the air upon its passage from the pump 42 to the generator 45. To increase the efficiency of the generator it is necessary to remove, or eliminate as much as possible this moisture, so that the ozone developed by the generator can be transported to the contact tank 12, without deterioration, in the dry air supplied by pump 42. Heretofore, it has been customary to remove this moisture by the use of, for example, a descant dryer or refrigeration device. To eliminate this cumbersome apparatus the upper, open end of the air pump inlet pipe 43 is provided with a removable, plug-shaped air dryer 50 having perforated upper and lower ends 51 and 52, respectively, and containing, for example, moisture absorbing crystals 53 of the variety that change color upon becoming moist or damp, and which can be dried out as by heating in an oven or the like, for reuse. Alternatively dryer 50, or one similar, could be removably mounted in an opening in the wall of housing 13 to absorb moisture from air as it enters the housing.

Removably secured in a flanged, central opening or vent 55 in the upper end of tank 12 is a cylindrical filter cap 56 having a reduced-diameter annular skirt portion 57 that is press-fit in opening 55. Removably secured in the bore of the skirt 57 is a replaceable, porous filter cartridge 58 containing activated charcoal. At its upper end cap 56 has a plurality of spaced holes or performtions 59, which enable excess gas in tank 12 to pass through filter 58 and perforations 59 to atmosphere.

Adjacent the vent 55 tank 12 also has in its upper end a water supply opening 61 (FIG. 2), which is normally sealed by a spring-loaded cap 62. This cap is mounted adjacent one of its edges for pivotal movement about a pin 63, which is mounted horizontally on the top of tank 12 adjacent opening 61. Cap 62 is urged to its closed position over opening 61 by a spring (not illustrated); and it has on its upper end a curved or hooked shaped handle 64 for moving the cap from its closed to its open position.

Fastened in housing 13 to the underside of its upper wall is a timer 66 having an operating shaft 67 that projects upwardly through the top of housing 13 and into the bore of an operating knob 68, which is secured to shaft 67. As illustrated schematically in FIG. 6, timer 66 includes, for example, a pair of spaced, stationary, arcuate contacts 70 and 71, and a rotatable contact 72, which is rotatable by the operating shaft 67 into and out of sliding, electrical contact with the contacts 70 and 71 as described hereinafter.

Power for operating the unit may be supplied from an alternating current (AC) power source through, for example, a conventional ON-OFF switch 74 (FIG. 6) to wires or lines L1 and L2. The movable contact in timer 66 is connected by a line 75 with the line L1; and the stationary contacts 70 and 71 are connected through relay coils CR2 and CR1, respectively, with the line L2. The motor 42' (FIG. 6) for the air pump 42 is connected in series between the lines L1 and L2 with the normally-open relay switch CR1—1, which is controlled by coil CR1; and the motor 35 for the water pump 34 is connected in series between L1 and L2 with a normally-open switch CR2–1, which is controlled by coil CR2.

In use, the cap 62 is swung manually to its open position, and a supply of potable drinking water, which is to be purified by ozone gas, is poured through the opening 61 into tank 12 substantially to fill the tank. Preferably tank 12 has a capacity approximately equal to, or slightly less than that of the pitcher 16. The shaft 67 is then rotated manually clockwise (FIG. 6) by the knob 68 to swing contact 72 into engagement with the contact 71, and against the resistance of a spring (not illustrated), which normally urges shaft 67 and contact 72 into a zero or off position wherein contact 72 is disengaged from both contacts 70 and 71 as shown in FIG. 6.

As soon as contact 72 engages contact 71 a circuit is completed from line L1 through line 75, contact 72, contact 71 and the relay coil CR1 to line L2, thus energizing coil CR1 and closing switch CR1–1 to energize the motor 42' for the air pump 42, and in a conventional manner, the generator 45. Generator 45 then begins to produce ozone gas, which is conveyed through the pipe 46 and the diffuser 48 to the water in tank 12. The diffuser 48 breaks up the ozone gas into fine bubbles that rise up through the water in tank 12, thereby oxidizing impurities in the water and removing undesirable odors and tastes therefrom that may be caused by excess concentrations of chlorine, sulphur, or other impurities in the water. The excess ozone gas that is not absorbed by the water in tank 12 passes upwardly through the filter unit 48 and the perforation 59 in the filter cap 56 to the atmosphere. The filter 58, however, operates to absorb any ozone gas that might prove damaging to surrounding surfaces if it were to escape from tank 12. This filter can be cleaned or replaced periodically.

The timer 66 is designed to allow an operator to energize the ozone generator 45 for anywhere from, for example, 5 to 30 minute intervals, and at the completion of each operation of generator 45, the pump motor 35 is operated for a 5 minute interval so that the water in tank 12 will be pumped automatically through tube 32 into the annular space around the outside of the filter element 24, from where the water will filter through element 24, and finally will pass through the upper end of the tube 28 into the pitcher 16. For this purpose contact 71 has an arcuate length approximately five times that of the contact 70; and the sliding contact 72, upon being rotated back to its starting position by the spring-loaded shaft 67, will always slide across contact 70 before reaching its starting position.

Figure 6:
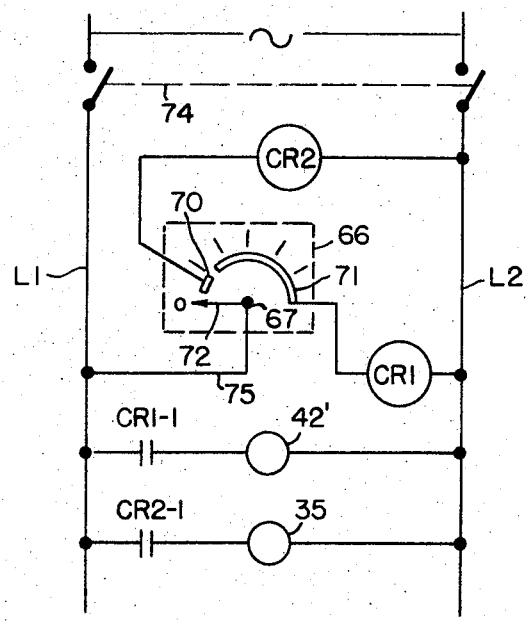
FIG. 6 is a wiring diagram illustrating one manner in which these units may be wired to operate.
Figure 2:
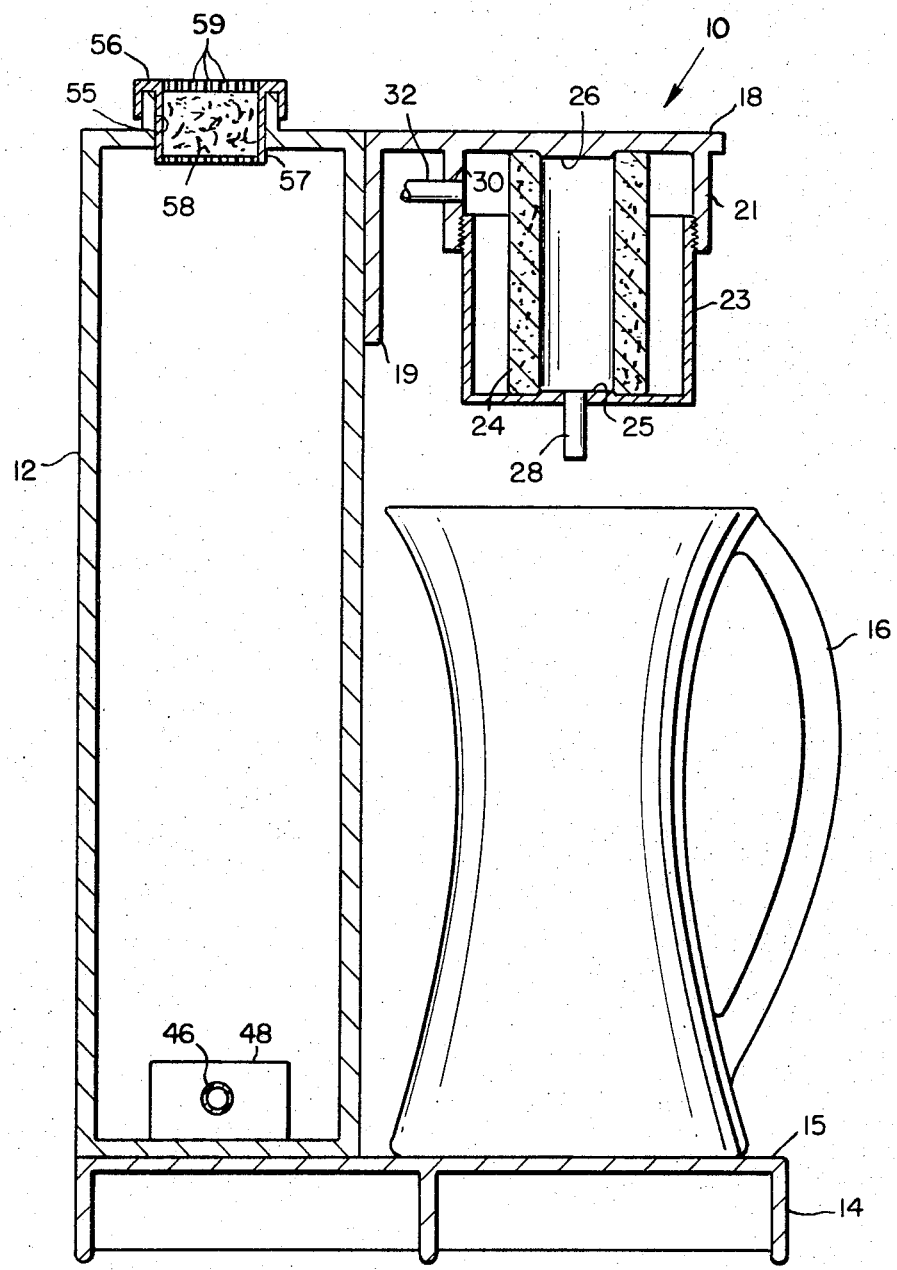
FIG. 2 is an enlarged, fragmentary sectional view taken along the line 2—2 in FIG. 1 looking in the direction of the arrows.

As illustrated in FIG. 6, rotation of the contact 72 180° clockwise from its illustrated position, will place contact 72 in engagement with the far or right end of the contact 71, so that it will take, for example, approximately 30 minutes for contact 72 to reach the point where it disengages contact 71, and engages contact 70, thereby successively to operate relay coil CR1 for 30 minutes, and then to deenergize this coil and to energize the coil CR2 for 5 minutes, before returning to its starting position where it disengages contact 70 to deenergize relay CR2, and hence the water pump motor 35.

From the foregoing it will be apparent that each batch of water that is placed in tank 12 is first subjected to an ozonation process during the period of time that the contact 72 is engaged with the contact 71; and then automatically the water tank 12 is pumped through the filter 24 in the cap 25 to the pitcher 16, where the pure, ozonated water is ready for use.

Referring now to FIGS. 4 and 5, wherein like numerals are employed to denote elements similar to those employed in the first embodiment, 80 denotes a modified batch-type unit comprising a rectangular housing 81 containing a contact tank 82 the upper end of which is connected by an inclined duct 83 with an opening 84 formed in one of the side walls of housing 81 adjacent its upper end. This opening 84 is normally closed by a spring-loaded door 85, which is mounted along its lower edge to pivot about a pin 86 carried in the side wall of housing 81. This door is pivotal against the resistance of a spring (not illustrated) from its closed or solid line position as shown in FIG. 5, to its open or broken line position to enable a quantity of potable water to be poured or otherwise fed into the tank to fill the latter to the level L.

Removably seated in a central opening 88 in the upper end of housing 81 is an inverted, plastic bottle or jug 89 having a reduced-diameter neck on its lower end that is removably threaded or press-fit sealingly into the upper end of a cup-shaped closure or cap 92, which is secured in housing 81 beneath and in registry with its opening 88.

As in the preceding embodiment, the water pump 34 is mounted in the bottom of housing 81 adjacent tank 82, and has its inlet connected by a pipe 37 with the interior of tank 82 adjacent its lower end, and has its outlet connected through a pipe 32 to a water filter 94, which may be of any conventional variety, but which preferably contains activated charcoal granules to remove any excess ozone gas that may remain in the water that is pumped from tank 82. The output of filter 94 is connected to the lower end of a stand pipe 95, the upper end of which projects through an opening in the cap 92, and into the lower end of the bottle 89.

Also as in the preceding embodiment, an air pump 42 is mounted in the housing 81 above the water pump 34, and has an air inlet 43, which is capped with a removable filter 51, and has an outlet connected by a pipe 44 with a conventional ozone generator 45. The output generator 45 is connected by a pipe 46 with a diffuser 48, which as in the first embodiment, is mounted in the tank 82 on the bottom thereof. A filter cap 56 is also removably mounted in a vent or opening in the top of tank 82 to absorb excess ozone gas that is developed in the tank.

To vent the interior of bottle 89, and to bleed off excess water that is pumped into the bottle, a vent pipe 96 is secured at one end in the top of tank 82 to extend part-way downwardly into the tank, and projects at its opposite end upwardly through the cap 92 and the interior of the bottle 89 to a point spaced slightly beneath the upper end of the bottle. A water discharge pipe or tube 97 is also secured at its upper end in the cap 92 to project slightly into the lower end of bottle 89, and is connected at its opposite end to a conventional cooler 98, which is mounted in housing 81 adjacent its upper end. This cooler has an outlet connected by a pipe 99 to a standard spring-loaded valve or spiggot 100, which is manually operable to drain water from bottle 89, by gravity feed, to a pitcher, glass, or other such container (not illustrated), which may be placed on a horizontal stand or platform 101 that is fixed to the front of the housing 81 beneath spiggot 100.

Mounted in housing 81 at the side thereof opposite the cover 85 is a timer 66, which as in the case of the first embodiment, is operable by a knob 68, which is fastened to the operating shaft of the timer at the exterior of the housing.

In use, the unit 80 is filled by pouring or otherwise feeding drinking water into tank 82 through its duct 83, after which the knob 68 of the timer is rotated to actuate the generator 45 for a predetermined period of time (for example 5, 10, 15, 20 minutes, etc.). After this interval the generator stops and the pump 34 is automatically operated for a 5 minute interval, for example, to pump the contents of tank 82, or a substantial portion thereof, upwardly into the holding tank 89. In this embodiment bottle 89 need not have a volume equal to or greater than that of the tank 82, since any excess water pumped into the bottle will recirculate down through the vent pipe 96 back into the tank 82 as soon as the level of the water in the bottle reaches the upper end of pipe 96. Also, the bottle 89 itself does not have a filtered vent, since any excess gas generated in the top of the bottle is free to pass down through the vent 96 to the tank 82, and then through filter 56, where excess ozone gas will be removed.

From the foregoing it will be apparent that the novel units disclosed herein provide relatively simple, inexpensive and compact devices for purifying drinking water by ozonating the water in a contact tank, and then automatically pumping the water from the contact tank to a storage tank or receptacle. In each unit 10 and 80, the contact tank 12 or 82 is first filled to a predetermined level, and then the double contact timer 66 is set manually for a selected time interval of from, for example, 10 to 30 minutes. The first portion of the selected interval results in the operation of the associated ozone generator, and the remaining portion (i.e., the period of time during which the contact 72 is in sliding engagement with the contact 70) results in the operation of the water pump 34 to transfer the ozonated water to pitcher 16 or to the storage bottle 89. This results in a very efficient use of the equipment since each batch of water is, for the most part, subjected to a single ozonating operation.

Moreover, in each case, when the water is pumped from the contact tank 12 or 82 it passes through a filter 24 or 94, respectively, which removes from the water excess ozone gas, as well as any undesirable particulate matter. Also, any excess ozone gas bubbling up through the water in the contact tanks is absorbed by the associated filter 56. Also, the efficiency of the ozone generator in each unit is enhanced by the filter 51 over the air inlet to the associated air pump 42.

Preferably the contact tanks 12 and 82 and other fittings that are exposed to ozone gas, are made from a plastic material which will not be corroded by ozone gas. Also, the timer 66 may be of any conventional type capable of being manually set to an operative position to effect successive operation of the ozone generator and water pump, respectively, of a particular unit 10 or 80 for selective intervals in the case of the generator and for a predetermined interval, in the case of the water pump. Moreover, instead of a timer having an adjustable operating interval, it may be desirable in some cases to always operate the ozone generator for a fixed interval, before operating the pump, in which case the timer could be operated by a simple pushbutton. Also, the contact tanks may be refilled manually, or may be connected to automatically controlled water supplies of known construction.

While in the illustrated embodiments separate vents and inlets have been provided for tanks 12 and 82, it will be apparent that in some instances a single opening in each tank will suffice for filling and ventilating the tank. In such case the single opening could be covered, for example, by a perforated cap containing a charcoal filter for excess ozone and could be spring-loaded into a normally closed position as in the case of cap 62. Moreover, while the illustrated equipment is suitable for removing odors and tastes from potable drinking water, it is equally suitable for purifying contaminated water of the type containing undesirable bacteria, viruses, detergents, algae, phenols, cyanides, etc. The water so purified is suitable also for ice making, cooking, etc.

Having thus described my invention, what I claim is:

1. Apparatus for purifying drinking water, comprising
   a first container for holding a supply of water,
   a perforated diffuser in said first container,
   an ozone generator connected to said diffuser and operable to supply ozone gas to said diffuser to be dispensed through the perforations therein into said first container and the water therein,
   a pump having its inlet connected to the interior of said first container,
   means connected to the outlet of said pump for conveying water therefrom to a second container,
   said means including a first filter interposed between said outlet and said second container to filter the water pumped into said second container, and
   manually settable timer means operable, when set, successively to energize said generator and said pump, respectively, first to supply ozone gas to said first container, then to pump the water in said first container to said second container.

2. Apparatus as defined in claim 1, wherein
   said first container has a pair of spaced openings in the upper end thereof,
   a spring-loaded cover is movably mounted on said first container adjacent one of said openings normally to be urged resiliently to a closed position over said one opening, and
   a second filter is removably mounted on said first container over the other of said openings to absorb excess ozone gas developed in said first container.

3. Apparatus as defined in claim 1, including
   a stand for supporting said containers adjacent one another,
   said conveying means further including
   a first conduit connecting the outlet of said pump to one side of said first filter,
   a second conduit having an inlet opening on the opposite side of said first filter to receive water from said pump after it has passed through said first filter, and having an outlet projecting exteriorly of said first filter, and
   means supporting said second conduit above said second container to have the outlet of said second conduit register with an opening in the upper end of said second container to deliver filtered water thereto.

4. Apparatus as defined in claim 3, wherein
   said supporting means comprises a member projecting laterally from said first container adjacent the upper end thereof to overlie said second container,
   a cylindrical housing has an open end sealingly and releasably secured to the underside of said member, and a closed end projecting beneath said member,
   said first filter comprises a porous, annular element sealingly seated at opposite ends against confronting surfaces on said member and said housing, respectively, and in radially spaced, coaxial relation to said housing,
   said first conduit opens at one end on the outlet of said pump and at its opposite end on the radial space between said housing and said element, and
   said second conduit is secured intermediate its ends in said closed end of said housing to be supported thereby above said second container with its inlet opening on the bore in said element.

5. Apparatus as defined in claim 1, including
   a stand for supporting said second container above said first container, and
   a duct opening at one end on said second container adjacent the upper end thereof, and at its opposite end on said first container, and operative to convey excess water from said second container back to said first container, when the level of the water in said second container exceeds a predetermined maximum.

6. Apparatus as defined in claim 5, wherein
   said second container is sealed,
   said first container has a vent in its upper end to connect the interior thereof to atmosphere, and
   said opposite end of said duct opens in said first container adjacent the upper end thereof also to vent the upper end of said second container to atmosphere.

7. Apparatus as defined in claim 1, including
   an air pump having an air inlet, and an outlet connected to said generator for supplying air under pressure to said generator,
   means connecting said air pump to said timer means for operation thereby concurrently with said generator, and
   an air filter removably secured over said air inlet for removing moisture from the air drawn into said air pump through its inlet,
   said filter including a moisture absorbing media which changes color upon absorbing moisture, and which may be heated to remove moisture therefrom.

8. Apparatus for purifying drinking water, comprising
   a base,
   a first container on said base for holding a supply of drinking water,
   a perforated diffuser mounted in said container adjacent its lower end,
   an ozone generator supported on said base adjacent said container and having an outlet connected to said diffuser for supplying ozone gas therethrough to the water in said container,
   means for removably supporting a second container in an operative position on said base adjacent said first container,
   a pump supported on said base adjacent the lower end of said first container, a first conduit connecting the inlet of said pump to the interior of said first container adjacent said lower end thereof, a second conduit connected at one end to the outlet of said pump, means supporting the opposite end of said second conduit on said base for communication with the interior of said second container, when the latter is in its operative position, electrical timer means supported on said base for controlling the operation of said generator, said timer means including a manually settable element movable from a normally off position selectively to a plurality of different operating positions corresponding, respectively, to the desired interval that said generator is to be operated, and means operative automatically to energize said pump for a predetermined period of time following each interval during which said generator is operated.

9. Apparatus as defined in claim 8, including a normally-closed member mounted over a first opening in said first container, and movable manually to an open position to admit a supply of water through said opening into said first container.

10. Apparatus as defined in claim 9, including an air filter removably mounted in a second opening in the upper end of said first container to vent the interior thereof to atmosphere, and to absorb excess ozone gas developed in said first container.

11. Apparatus as defined in claim 8, wherein said means for supporting said second container comprises a plane surface formed on said base and projecting laterally beyond the lower end of said first container, said means for supporting the opposite end of said second conduit comprises a member projecting laterally from the upper end of said first container in vertically spaced relation to said plane surface, and said opposite end of said second conduit is secured to, and projects downwardly from said member to register with an opening in the upper end of said second container, when the latter is in its operative position.

12. Apparatus as defined in claim 8, wherein said means for supporting said second container comprises a housing surrounding said first container and projecting thereabove, said means for supporting the opposite end of said second conduit comprises a capping member mounted in said housing beneath and in registry with an opening in the upper end of said housing, said second container is removably mounted on said housing above said first container, and has a flanged opening in its lower end which projects downwardly through said opening in the upper end of said housing, and sealingly into a recess in the upper end of said capping member to be sealed thereby, and said opposite end of said second conduit projects through an opening in said capping member and into said opening in the lower end of said container to deliver water thereto from said pump.

13. Apparatus as defined in claim 12, wherein a third conduit is secured at one end in the upper end of said first container to communicate with the interior thereof, and projects at its opposite end through said capping member and substantially into said second container to vent the upper end thereof, when said second container is in its operative position.

* * * * *